(12) United States Patent
Breier

(10) Patent No.: US 7,743,900 B2
(45) Date of Patent: *Jun. 29, 2010

(54) TORSIONAL VIBRATION DAMPER

(75) Inventor: Horst Breier, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 720 days.

This patent is subject to a terminal disclaimer.

(21) Appl. No.: 11/486,137

(22) Filed: Jul. 13, 2006

(65) Prior Publication Data

US 2007/0017767 A1    Jan. 25, 2007

(30) Foreign Application Priority Data

Jul. 22, 2005    (DE) .................. 10 2005 034 338

(51) Int. Cl.
  *F16H 45/02*  (2006.01)
  *F16D 3/12*   (2006.01)
  *F16D 3/66*   (2006.01)
  *F16F 15/123* (2006.01)

(52) U.S. Cl. .................. 192/213; 192/3.29; 192/70.17; 192/212; 464/68.1; 464/67.1

(58) Field of Classification Search .................. 192/213
See application file for complete search history.

(56) References Cited

U.S. PATENT DOCUMENTS

| 4,376,477 | A | * | 3/1983 | Loizeau | .................. | 192/201 |
| 4,410,075 | A | * | 10/1983 | Caray et al. | .................. | 192/213.3 |
| 4,735,297 | A | * | 4/1988 | Koshimo | .................. | 192/3.29 |
| 5,810,138 | A |   | 9/1998 | Bertram et al. | | |
| 5,941,354 | A |   | 8/1999 | Fukushima et al. | | |
| 6,223,872 | B1 | * | 5/2001 | Heller et al. | ................ | 192/3.29 |
| 7,267,212 | B2 | * | 9/2007 | Wack et al. | ................ | 192/3.29 |
| 2005/0239557 | A1 | * | 10/2005 | Wack et al. | ................ | 464/62.1 |

FOREIGN PATENT DOCUMENTS

| DE | 44 14 519 | 2/1997 |
| DE | 197 52 451 | 8/2001 |

* cited by examiner

*Primary Examiner*—Richard M. Lorence
(74) *Attorney, Agent, or Firm*—Cohen Pontani Lieberman & Pavane LLP

(57) ABSTRACT

A torsional vibration damper for a bridging clutch of a hydrodynamic clutch arrangement is provided with a drive-side transmission element and a takeoff-side transmission element, which can be deflected around a certain angle of rotation relative to the drive-side element against the action of energy storage devices, where at least one driver element with an actuating function is assigned to each energy storage device. To realize a multi-stage action of the energy storage device, at least some of these driver elements arrive in working connection with an assigned final turn of the corresponding energy storage device only after using up a predetermined clearance gap in the circumferential direction. For this purpose, at least one transmission element has openings to accommodate energy storage devices, and at least one circumferential boundary of each opening is provided as a driver element for the assigned energy storage device. In the absence of any relative rotational deflection of the transmission elements, at least one of the circumferential boundaries of some of the openings is separated from the adjacent final turn of the assigned energy storage device by a predetermined angular gap. The predetermined angular gap is used up only after the transmission elements have rotated a predetermined relative distance, at which point the corresponding circumferential boundary acts as the driver element on the adjacent final turn of the assigned energy storage device.

12 Claims, 5 Drawing Sheets

TORSIONAL VIBRATION DAMPER

BACKGROUND OF THE INVENTION

1. Field of the Invention

The invention pertains to a torsional vibration damper for a bridging clutch of a hydrodynamic clutch arrangement with a drive-side transmission element and a takeoff side transmission element, wherein the takeoff side element is rotatable by a limited amount relative to the drive side element under the action of energy storage devices.

2. Description of the Related Art

A torsional vibration damper assigned to the piston of a bridging clutch of a hydrodynamic clutch arrangement such as a torque converter, the damper being equipped with a drive-side transmission element attached to a piston of a bridging clutch, with an intermediate transmission element, and with a takeoff-side transmission element attached nonrotatably to a turbine wheel, is known from U.S. Pat. No. 5,941,354, where the drive-side transmission element and the takeoff-side transmission element position the intermediate element between them by means of a plurality of energy storage devices. According to FIG. 3, the intermediate element has not only openings for drive elements of both the drive-side transmission element and the takeoff-side transmission element but also its own drive element, which engages between two energy storage devices, where the openings of the intermediate element are larger in the circumferential direction than the associated drive element. As a result, a first stage of spring action is in effect in a first direction R1 of relative rotational deflection along a first travel path s1 until the drive element of the drive-side transmission element has used up the associated opening of the intermediate transmission element and comes into direct contact with a stop of the latter. When the relative rotational deflection between the two transmission elements becomes even larger, a second stage of spring action goes into effect under the effect of the drive element of the intermediate transmission element along a second travel path s2 until the intermediate transmission element has arrived in direct contact with a stop of the takeoff-side transmission element. In the opposite direction R2 of relative rotational deflection, this process takes place in a comparable manner, although, because the dimensions of the openings of the intermediate transmission element are different, different travel paths s1, s2 are predefined for the action of the individual spring stages. As a result, the torsional vibration damper operates differently during phases in pull mode than it does during phases in push mode. In sum, because there are two different stages of spring action in each of the two directions R1, R2 of relative rotational deflection, what is obtained is a low degree of spring stiffness at small relative rotational deflections and a high degree of spring stiffness at large relative rotational deflections.

Although it is possible with this torsional vibration damper to adapt the spring stiffness with considerable sensitivity to the degree of relative rotational deflection between the two transmission elements and also to adapt that stiffness optimally to operational phases in pull and push mode, energy storage devices are used which are very long in the circumferential direction, for which reason these devices must be guided along their entire radially outer circumferential dimension by suitable circumferential supports in such a way that they can resist the action of the centrifugal forces caused by the rotation of the damper. Nevertheless, under the action of centrifugal force, strong frictional forces develop between the individual turns of the spring and the circumferential support, and, as the degree of the relative rotational deflection of the transmission elements increases, these forces lead to a considerable reduction in the ability of the energy storage devices to deform and, as a result, to a considerable deterioration in the quality with which vibrations can be isolated. The energy storage devices which are situated in the radially outer area and thus have considerable length in the circumferential direction, furthermore, require a great deal of work to manufacture and are therefore expensive.

A torsional vibration damper of simpler design and lower cost is known from U.S. Pat. No. 5,810,138, which discloses a drive-side transmission element, a takeoff-side transmission element, and energy storage devices installed functionally between them. This torsional vibration damper, too, is assigned to the piston of a bridging clutch of a hydrodynamic clutch arrangement such as a torque converter and is for this purpose connected nonrotatably by its drive-side transmission element to the piston of the bridging clutch, whereas the takeoff-side transmission element is attached to a sleeve connected nonrotatably to a gearbox input shaft.

The energy storage devices in this torsional vibration damper are arranged in specially provided openings in the transmission elements and are thus located on a relatively small radius around the axis of rotation. As a result, the energy storage devices are very short in the circumferential direction, so that, under the action of centrifugal force, they are bent radially outward to only a very limited extent. Nevertheless, this torsional vibration damper, regardless of the angle of relative rotational deflection at the moment in question, can react only with the one stage of spring action, nor does it have the capacity to operate under push-mode conditions differently than it does under pull-mode conditions. It is therefore to be considered especially suitable for small torsional vibration dampers with only moderate vibrational isolation quality.

SUMMARY OF THE INVENTION

The invention is based on the task of designing a torsional vibration damper in such a way that that, while being of simple design and low in cost, it can react with low friction and with different stages of spring action to different angles of relative rotational deflection, while at the same time its behavior takes into account both pull-mode and push-mode phases of operation.

According to the invention, at least one transmission element has a plurality of openings for each direction of relative rotation, at least one circumferential boundary of each opening being provided as a driver element for the assigned energy storage device. In the absence of any relative rotation of the transmission elements, at least one of the circumferential boundaries of some of the openings is separated from the adjacent final turn of the assigned energy storage device by a predetermined angular gap which closes only when the transmission elements have undergone a predetermined relative rotation in a selected direction. At this point the corresponding circumferential boundary acts as the driver element on the adjacent final turn of the assigned energy storage device.

Under the assumption that each transmission element has a plurality of openings, openings of at least two different lengths with respect to the energy storage devices which they accommodate are provided. As a result, it is possible for different angular gaps to be present between at least one of the boundaries at the circumferential ends of the opening in question and the adjacent final turn of the associated energy storage device. These different gaps mean that the circumferential boundary can freely travel different distances before it comes to rest against the final turn and thus fulfills its function as a drive element for this particular energy storage device. As a result, the energy storage devices in the individual openings are actuated by the associated drive element at different angles of relative rotation of the transmission elements, so that, as a function of the size of the first angular gap, which obviously can also be "zero", at first only a single energy storage device is active, which means that the torsional vibration damper is functioning here with a rather low degree of spring stiffness. Only as the relative degree of deflection increases will an additional energy storage device go into action, thus creating a second stage of spring action, and, after yet another increase in the degree of relative rotation, possibly at least one additional energy storage device goes into action, thus creating yet another stage of spring action, so that, as the degree of relative rotation continues to increase, the spring action which opposes this relative rotational deflection becomes continuously stronger.

As the number of openings and thus of energy storage devices in the transmission element increases, the number of angular gaps increases also, which means that the spring action can have more and more individual stages by which the behavior of the damper can be adapted with greater and greater sensitivity to the degree of relative rotational deflection. The result of this is an extremely high quality of vibrational isolation without any additional design effort, because, in the transmission element in question, the openings, which must be provided in any event, merely have to be dimensioned appropriately in the circumferential direction with respect to the energy storage devices to be installed in them.

By designing the transmission element in question with different predetermined angular gaps as a function of the respective direction of relative rotational deflection, furthermore, it is also possible to adapt the spring action—again without any additional design effort—to the operating phase in question, i.e., to operation in push mode or to operation in pull mode. The previously explained multi-stage aspect of the spring action will obviously go into effect regardless of the direction of relative deflection at the time in question.

According to an advantageous elaboration of the openings provided in the transmission elements, each of which holds an energy storage device, the circumferential boundaries of the openings are oriented in a specific way with respect to the adjacent final turns of the corresponding energy storage device. It is assumed here that each of the circumferential boundaries is aligned with a first connecting line VL1 leading to a first axis of rotation D1, and that, in the absence of any relative rotational deflection of the transmission elements, each of the circumferentially final turns of the energy storage devices is aligned with a second connecting line VL2 leading to a second axis of rotation D2. If the second connecting line VL2 is separated from the first connecting line VL1 by a certain starting adjustment angle $\phi_{anf}$, then, when the relative rotational deflection of the transmission elements begins, the adjustment angle $\phi$ starts to change, and it continues to change until the degree of relative rotational deflection between these elements reaches a predetermined limit at the associated circumferentially final turn of each energy storage device. That is, the adjustment angle changes from the starting adjustment angle $\phi_{anf}$ to the final adjustment angle $\phi_{end}$, which is also situated between the second connecting line VL2 and the first connecting line VL1. The adjustment angle $\phi$ stops changing, at least essentially, only when the relative rotational deflection of the transmission elements at the circumferentially final turns of each energy storage device exceeds the predetermined limit of the relative rotational deflection. The final adjustment angle $\phi_{end}$ remains unchanged.

As long as the starting adjustment angle $\phi_{anf}$ is present, the circumferentially final turn of the energy storage device comes into contact only with the radially outer area of the adjacent circumferential boundary of the opening. As its continues farther radially inward, therefore, the circumferentially final turn becomes farther and farther away from the associated circumferential boundary, reaching a maximum distance from it in the area of the radially inner side of the opening.

It is preferable to select a precurved energy storage device with a neutral energy storage radius ($r_{FN}$) which is only slightly larger or possibly essentially equal to the average radius ($r_m$) of the opening. Because, when the relative rotational deflection of the transmission elements begins, the circumferentially final turns of the energy storage device rest initially only against the radially outer area of the circumferential boundaries of the openings, a deformation force is introduced into the energy storage devices, namely, in the radially outer area of those devices. A stabilizing force is thus created, which acts in opposition to centrifugal force and which therefore acts essentially in a radially inward direction. The degree to which the energy storage device is deflected by centrifugal force is thus considerably reduced. At the same time, the following positive effect goes into action with respect to the spring characteristic:

Because only part of the radial surface of the circumferentially final turn of the energy storage device makes contact with the boundary, the deformation of the energy storage device begins with comparatively low spring stiffness. As the relative rotational deflection between the transmission elements increases, however, the stiffness increases progressively, because, with increasing relative rotational deflection, an ever larger radial component of the circumferentially final turn of the energy storage device becomes supported against the adjacent circumferential boundary of the opening. This process does not stop until the relative rotational deflection reaches a certain limit and the final adjustment angle $\phi_{end}$ is present, this angle being smaller than the starting adjustment angle $\phi_{anf}$, being, in fact, zero in the ideal case. Essentially the entire surface of the circumferentially final turn of the energy storage device now rests against the circumferential boundary of the opening.

At this point, the previously described first set of deformation conditions VB1 of the energy storage device, under which the energy storage device is deformed with a first stiffness increase FS1, has run its course, and it is now followed by a second set of deformation conditions VB2, under which the energy storage device is deformed according to a second stiffness increase FS2. As a result, an especially soft response behavior is achieved at small relative rotational deflections, but a comparatively high spring stiffness goes into effect at larger relative rotational deflections.

It is preferable for the individual energy storage devices to be inserted into their assigned openings without any significant pretension, so that, at very small relative rotational deflections between the transmission elements, and especially during a transition between pull-mode and push-mode phases, there will be no need to overcome any initial pretension before any benefit can be derived from the elasticity of the energy storage devices. Instead, the energy storage devices can be inserted into the openings in such a way that there is a limited amount of free travel present in the circumferential direction in both directions of deflection.

A useful combination of the measures discussed above is present when at the same time a clearance space is provided on the radially outer side of the opening in question for the energy storage device. This clearance space prevents contact between the turns of the energy storage device and the radially outer side of the opening and thus prevents undesirable friction. The clearance space is preferably obtained by providing the radially outer surface of the opening with a certain curvature, namely, with a clearance radius $r_{FR}$ around an axis of rotation D3 which is considerably smaller than the outside radius $r_a$ which the radially outer side of an opening without a clearance space, used for comparison, would have around an axis of rotation D2. The penetration space thus created in the opening for the turns of the energy storage device is therefore larger in the circumferentially central area of the energy storage device than in the area of the circumferentially final turns, which are usually subjected to very much weaker centrifugal force-induced radial deflection than the turns in the circumferentially central area. As a result of a design such as this, a clearance space is created for the energy storage device in the radially outer area without significantly increasing the size of the opening in the radial direction. As a result, an unnecessary weakening of the material of the transmission elements is avoided. Of course, with respect to the radial dimensioning of the openings, especially in their radially outer area, it is advantageous that the energy storage devices are deflected radially outward to only a limited degree because of the inventive way in which they are installed between the two circumferential boundaries and because of the previously explained stabilizing force.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
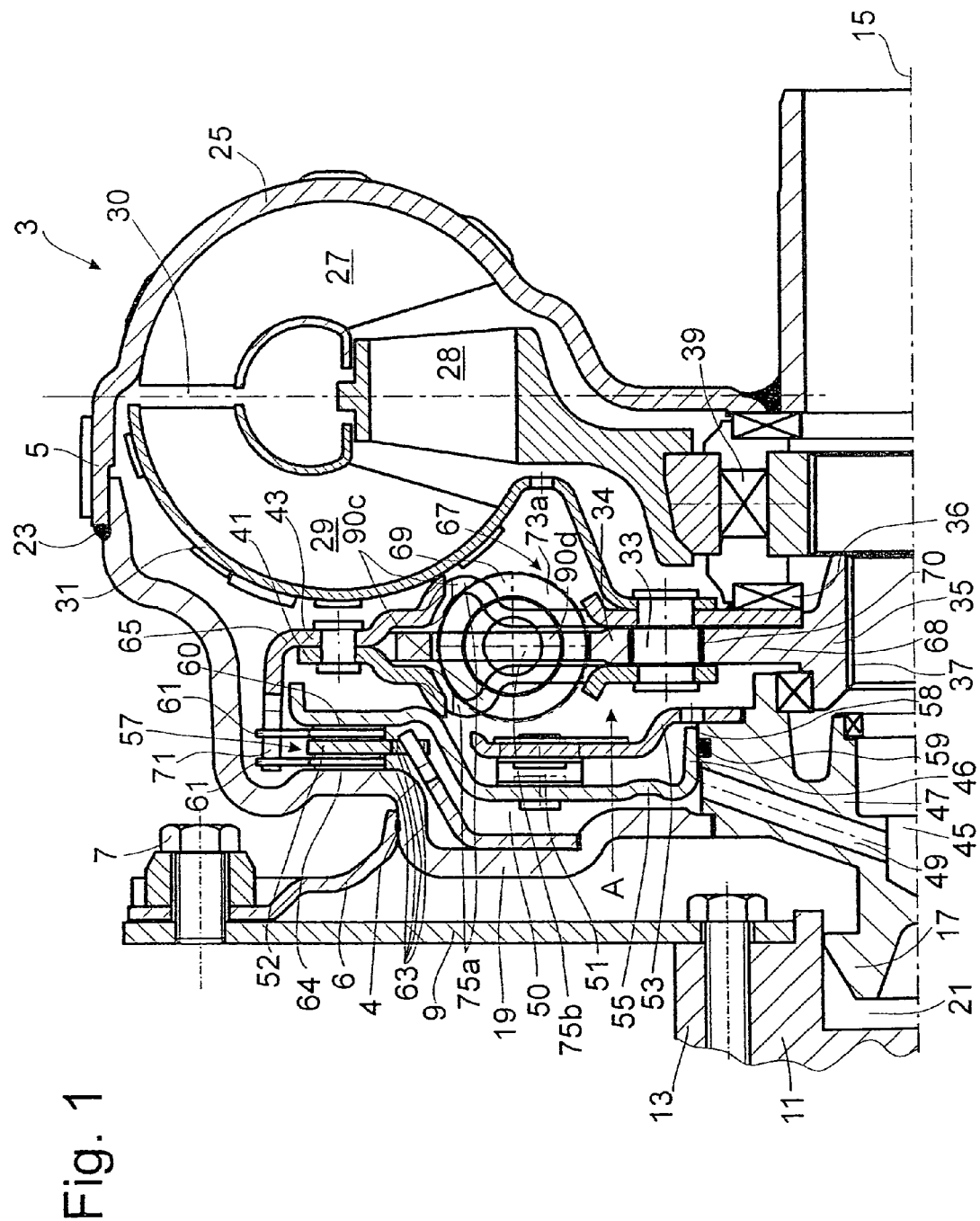
FIG. 1 shows the upper half of a longitudinal cross section through a hydrodynamic clutch arrangement with a piston of a bridging clutch and a torsional vibration damper assigned to the latter.

The hydrodynamic clutch device 3 shown in FIG. 1 has a clutch housing 5, to which a tie plate 6 is attached by means of a weld 4. This plate 6 can be connected for rotation in common to a drive 11, such as the crankshaft 13 of an internal combustion engine, by means of a plurality of mounting elements 7 and a coupling element 9 such as a flexplate.

The clutch device 3 also has a bearing journal 17 in the area of an axis of rotation 15. The journal is provided on a cover 19 of the housing 5 and is held in a centering guide 21 on the drive 11.

The cover 19 is permanently connected by a weld 23 to a pump wheel shell 25 of a pump wheel 27, which cooperates with a turbine wheel 29 and a stator 28 to form a hydrodynamic circuit 30. The turbine wheel 29 has a turbine wheel shell 31, which is centered on a turbine hub 35, which rests against a freewheel 39 of the stator 28 by way of an axial bearing 36. The turbine hub 35 is connected for rotation in common to a gearbox input shaft (not shown), mounted radially inside the turbine hub 35 by way of a set of teeth 37. Gearbox input shafts of this type are usually designed with a central bore, which leads out into a transition space 45, which is connected by means of through-openings 49 in a housing hub 47 to a pressure chamber 50, which is provided axially between the cover 19 and the piston 55 of a bridging clutch 57. The piston 55 has a piston carrier 53, which is attached to the piston by means of tangential leaf springs 51 to produce a nonrotatable connection between the piston 55 and the cover 19 of the housing hub 47.

The piston 55 has a base 46 on the radially inner end, by which it is mounted with a sealing action by way of a seal 59 on a receiving surface 58 of the housing hub 47, while its radially outer area has a friction surface 60, which rests against a friction lining 63 of a plate 61. This plate 61 is ultimately supported against a friction surface 64 of the cover 19 through the intermediate contact of another friction lining 63, an intermediate plate 52, and another plate 61 with friction linings 63 on both sides. The plates 61 are each connected nonrotatably to a set of teeth 71 of a drive-side transmission element 65 of a torsional vibration damper 67, where this drive-side transmission element 65, formed by cover plates 41 and 43, is attached by rivets 33 to the turbine wheel shell 31. The drive-side transmission element 65 is supported by a set of circumferential springs 69 against a takeoff-side transmission element 68 of the torsional vibration damper 67, formed in this concrete embodiment by the turbine hub 35. The rivets 33, which engage with predetermined circumferential play in assigned openings 70, limit the relative rotational deflection between the drive-side transmission element 65 and the takeoff-side transmission element 68.

Figure 2:
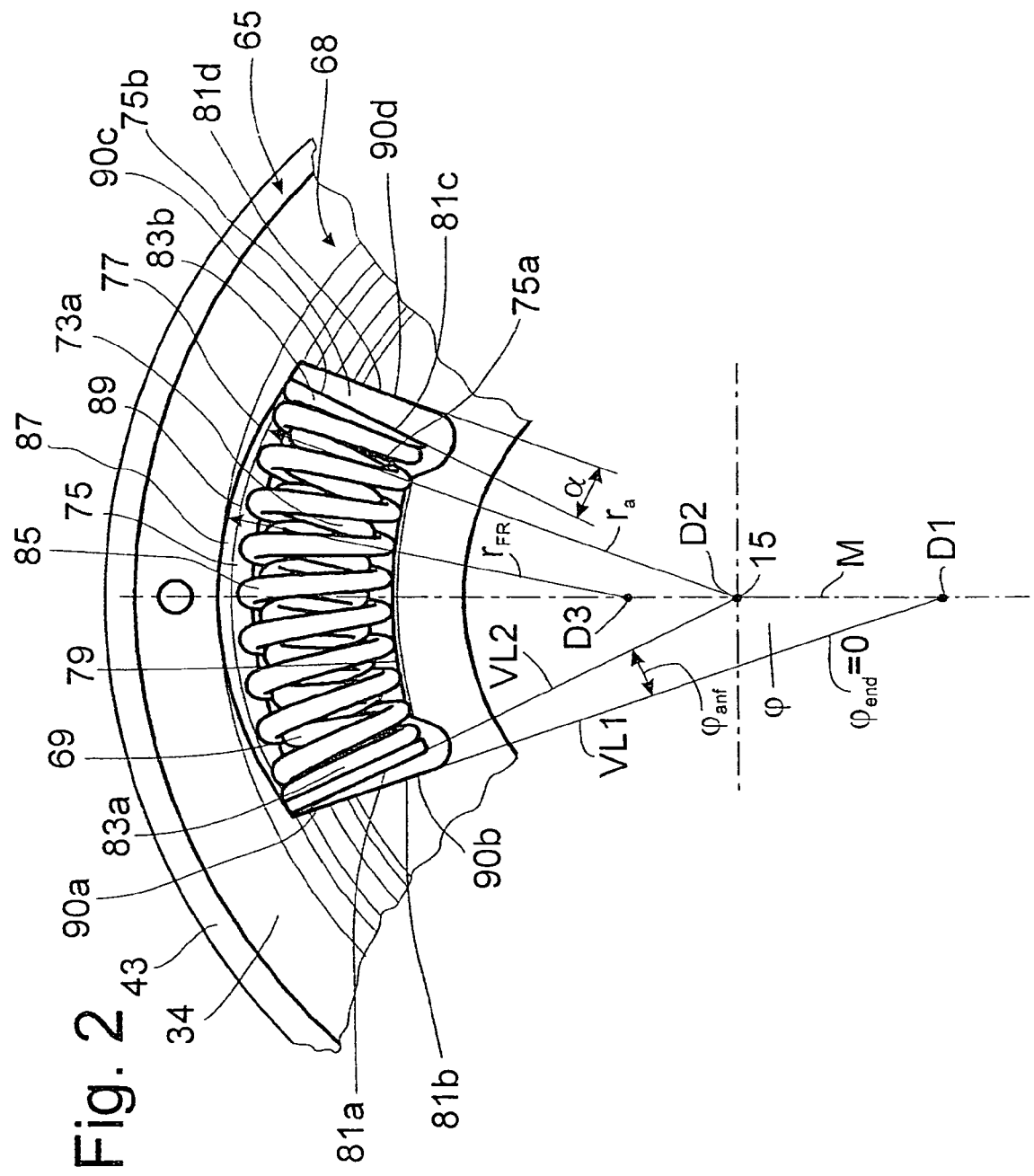
FIG. 2 shows a plan view of the torsional vibration damper, looking in direction A of FIG. 1, with openings for energy storage devices, where the two final turns of the energy storage device, shown in its entirety, come to rest against the circumferential boundaries of the openings.

FIG. 2 shows the cover plate 43 of the drive-side transmission element 65 of the torsional vibration damper 67, namely, the plate facing away from the piston 55 of the bridging clutch 57. This plate is seen behind a hub disk 34, which is provided on the takeoff-side transmission element 68 and therefore on the turbine hub 35. An energy storage device 73a belonging to the set of circumferential springs 69 is arranged in an opening 75a in the cover plate 43 and also in a comparable opening in the cover plate 41 (FIG. 1). For the sake of simplicity, only the cover plate 43 is considered in the following. The cover plate 41 is equivalent to it in terms of its movements. The opening 75a in the cover plate 43 has boundaries 81a and 81c at the circumferential ends, which, for the energy storage device 73a, act as driver elements 90a and 90c against the circumferentially final turns 83a and 83b of the energy storage device 73a. The energy storage device 73a fits in a opening 75b provided in the takeoff-side transmission element 68, which means, therefore in an opening in the hub disk 34 of the turbine hub 35. This opening 75b has circumferential boundaries 81*b* and 81*d*, which act as driver elements 90*b* and 90*d* for the adjacent final turns 83*a* and 83*b* of the energy storage device 73*a*.

The openings 75*a*, 75*b* consist in each case of a radially outer side 77 and a radially inner side 79, which connect the two circumferential boundaries 81*a* and 81*c* and the two circumferential boundaries 81*b* and 81*d* to each other. Between its two final turns 83*a*, 83*b*, the energy storage device 73*a* has a plurality of central turns 85 extending in the circumferential direction.

FIG. 2 shows the energy storage device 73*a* without any rotational deflection between the two transmission elements 65 and 68 of the torsional vibration damper 67. The energy storage device 73*a* is installed essentially without pretension and with precurvature in the opening 75*a* in the cover plate 43. With respect to the opening 75*b* in the hub disk 34, however, a predetermined angular gap α is present, which forms a clearance angle, the function of which will be explained again in greater detail on the basis of FIGS. 3 and 5.

FIG. 2 shows an axis of rotation D1, which is obtained by extending the circumferential boundary 81*b* of the opening 75*b* in the hub disk 34 radially toward the inside to form a connecting line VL1, which intersects a center line M of the opening 75*a* in the cover plate 43. A second connecting line VL2 is formed by extending the circumferentially final turn 83*a* of the energy storage device 73*a* radially toward the inside until this connecting line VL2 intersects the previously mentioned center line M to form a second axis of rotation D2. The axis of rotation D2 can coincide, at least essentially, with the axis of rotation 15 of the clutch housing 5.

As a result of this geometric arrangement of the energy storage device 73*a* and the opening 75*b*, there exists between the two connecting lines VL1 and VL2 a starting adjustment angle $\phi_{anf}$, as a result of which only the radially outer part of the circumferentially final turn 83*a* rests against the adjacent circumferential boundary 81*b* of the opening 75*b*, and after the angular gap α has been used up, only the radially outer part of the final turn 83*b* of the energy storage device 73*a* comes to rest against the boundary 81*d*. As additional relative rotational deflection takes place between the transmission elements 65 and 68 of the torsional vibration damper 67, a force is exerted on the energy storage device 73*a* via its circumferentially final turns 83*a* and 83*b*, which force generates a radially inward-directed stabilizing force on the energy storage device 73*a*. As a result, the energy storage device 73*a* and especially the circumferentially central turns 85 do not make contact with the radially outer side 77 of the opening 75*b* even under the effect of centrifugal force.

The increasing relative rotational deflection of the two transmission elements 65 and 68 with respect to each other has the effect that the circumferentially final turns 83*a*, 83*b* of the energy storage device 73*a* are pressed with ever greater force against the circumferential boundaries 81*b*, 81*d* of the opening 75*b*. As a result, ever-larger radial sections of the final turns, starting radially from the outside, make contact with their assigned circumferential boundaries 81*b*, 81*d*. The adjustment angle φ between the connecting lines VL1 and VL2, starting from the starting adjustment angle $\phi_{anf}$, thus decreases continuously until, starting from a predetermined limit of the relative rotational deflection between the transmission elements 65 and 68, it has fallen to the value 0. As shown in FIG. 2, when the amount of relative rotational deflection reaches the predetermined limit, the connecting line VL2 will coincide with the connecting VL1, and the angle φ becomes the ending adjustment angle $\phi_{end}$, where $\phi_{end}$ assumes the value "zero".

When the amount of relative rotational deflection of the transmission elements 65, 68 exceeds the predetermined deflection limit, one of the circumferentially final turns 83*a*, 83*b* of the energy storage device 73*a* will always be resting by its full surfaces against the adjacent circumferential boundary 81*b*, 81*d* of the opening 75*b*.

As FIG. 2 also shows, each opening 75*a* and/or 75*b* can be provided in the area of the radially outer side 77, especially in the circumferentially central area of the radially outer side 77, with a clearance space 87, which increases the area into which the circumferentially central turns 85 of the energy storage device 73*a* can travel. Designing the radially outer side 77 in this way is especially advantageous, because it is precisely the circumferentially central turns 85 which undergo a comparatively large degree of radial deflection toward the radially outer side 77 under the effect of centrifugal force. Although this radial deflection is limited by the previously mentioned stabilizing force, the goal of the clearance space 87 is to prevent at all costs any contact of the individual turns, especially of the circumferentially central turns 85, with the associated radially outer side 77 of the opening 75*a*. It is preferable for the clearance space 87 to be formed by a clearance radius $r_{FR}$ around an axis of rotation D3, this clearance radius $r_{FR}$ being smaller than the outer radius $r_a$ around the axis of rotation D2, where this outer radius $r_a$ would describe the radially outer side 77 if it did not have the clearance space 87. The radially outer side without a clearance space, i.e., the side defined by the outer radius $r_a$, is shown in FIG. 2 by an auxiliary line 89.

According to FIG. 2, the clearance space 87 in the openings 75*a*, 75*b* is shown in conjunction with the measures for producing the stabilizing force which acts in opposition to centrifugal force, but it can also be implemented without these measures, because, in comparison with a radially outer side 89 without a clearance space, it increases the distance between the turns of the energy storage device 73*a*, here in particular the circumferentially central turns 85, and the associated radially outer side 77 of the openings 75 and thus is able at least to reduce the friction, caused by centrifugal force, between the turns of the energy storage device 73*a* and the radially outer side 77 of the opening 75*b*.

The design solutions described above pertaining to the openings 75*a* and 75*b* and to the energy storage device 73*a* can also be applied, of course, to the additional openings 75*c*-75*h* and to the energy storage devices 73*b*-73*d* installed in them in the embodiments of FIGS. 3-5 described below.

Figure 3:
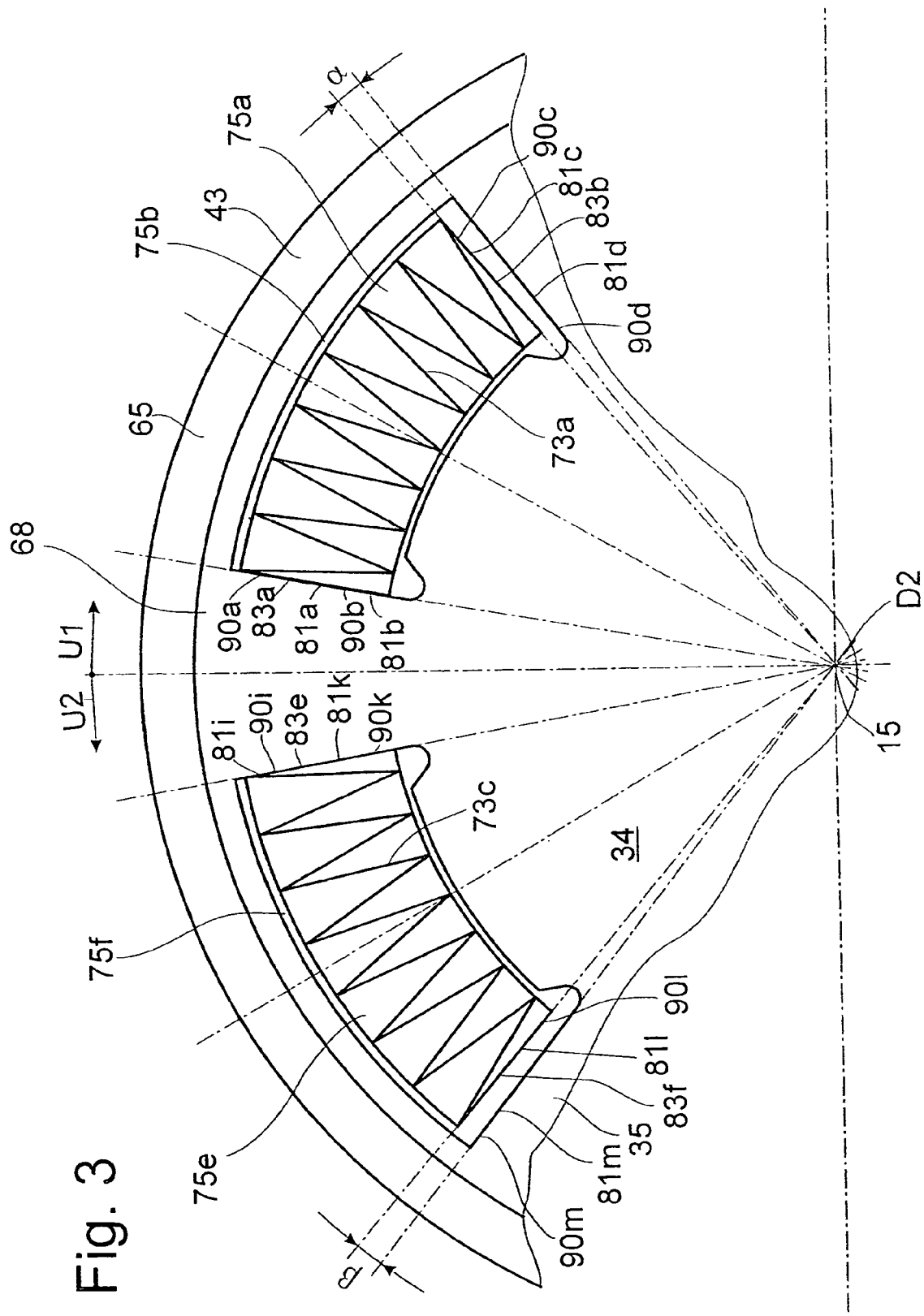
FIG. 3 is similar to FIG. 2, except that it shows openings for the energy storage devices in which a final turn of each energy storage device is separated from the adjacent circumferential boundary of the opening by a predetermined angular gap; and except that both this final turn and this circumferential boundary are each aligned with the axis of rotation D2 of the torsional vibration damper
Figure 4:
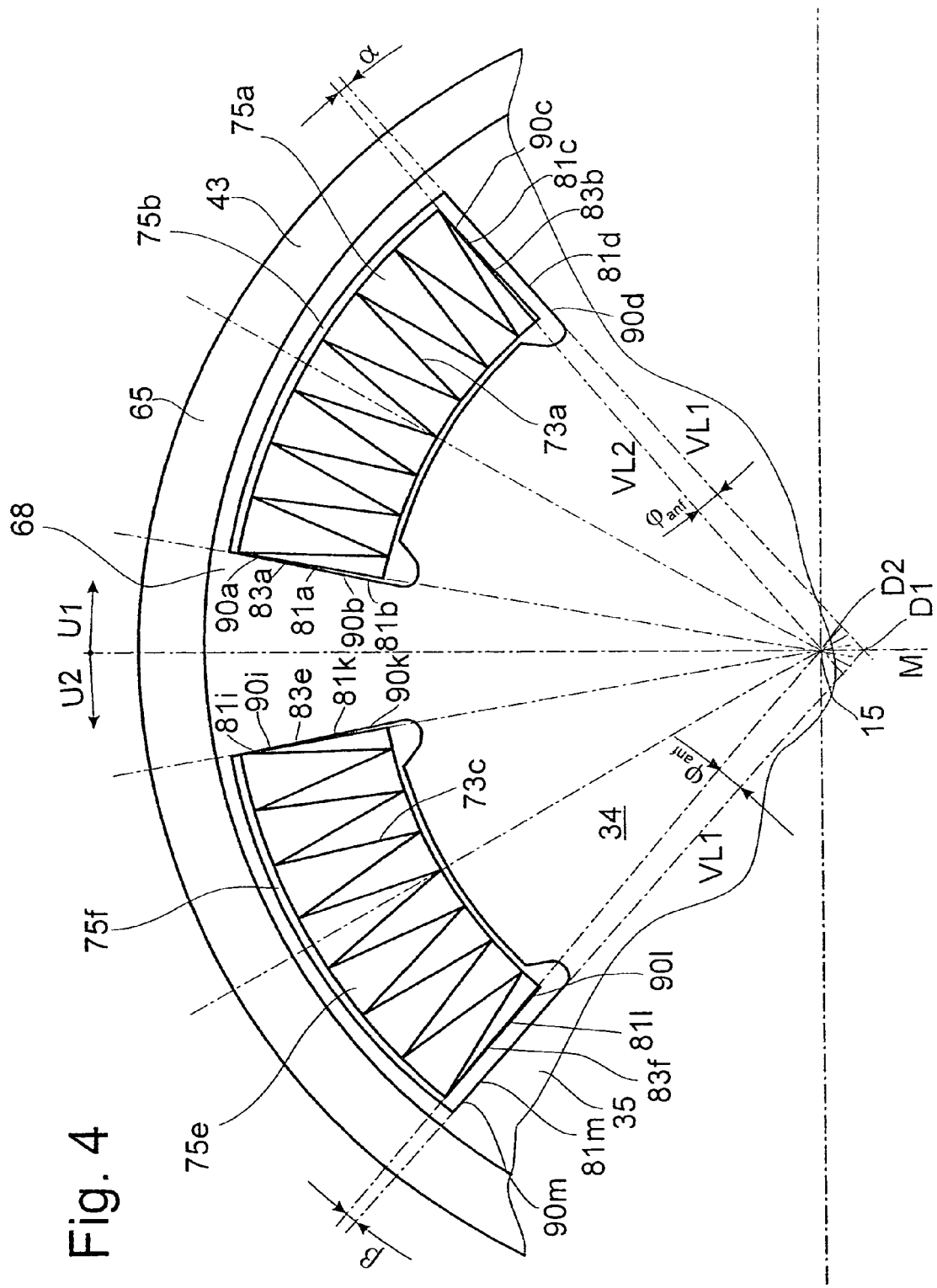
FIG. 4 is similar to FIG. 3, except that the circumferential boundary is aligned with an axis of rotation D1 which is offset from the axis of rotation D2 of the torsional vibration damper.
Figure 5:
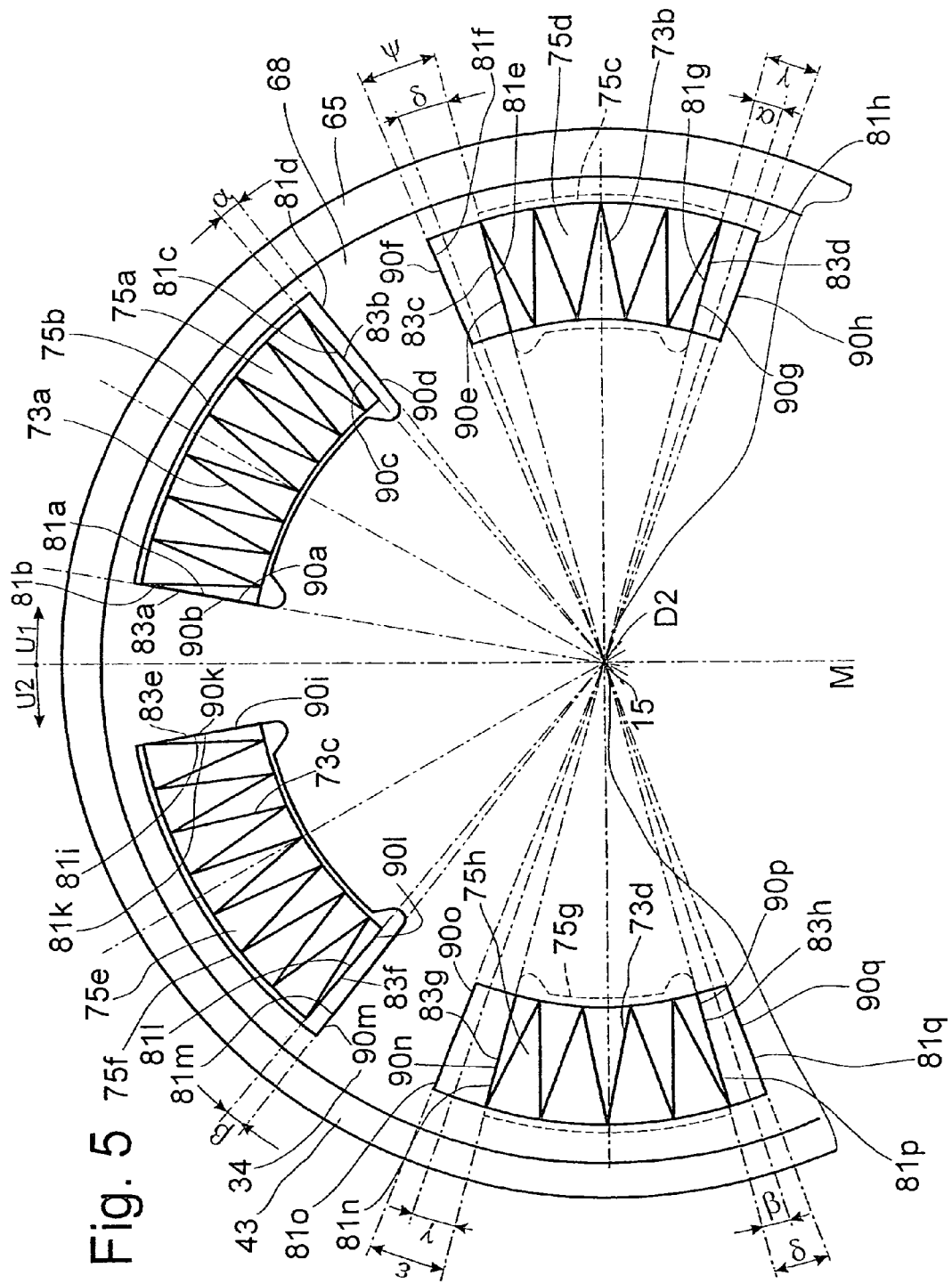
FIG. 5 is similar to FIG. 3, except that additional openings for energy storage devices are provided, in which both of the two final turns come are separated from the adjacent circumferential boundaries at predetermined angular gaps.

So that, again, it is easier to see the features of the openings 75*b* and 75*f* provided in the hub disk 34 in FIGS. 3-5 and the features of the openings 75*d* and 75*h*, shown in FIG. 5 only, the cover plate 43 of the drive-side transmission element 65 of the torsional vibration damper 67 facing away from the piston 55 of the bridging clutch 57 is shown behind the hub disk 34, namely, in a starting position free of any relative rotational deflection. The previously described energy storage device 73*a*, which cooperates with the opening 75*b*, also previously described, in the hub disk 34, is inserted into the opening 75*a* in the cover plate 43, this opening being offset in the clockwise direction U1 from the center line M, and is therefore obviously also inserted into the opening in the cover plate 41 (not shown).

FIG. 3 also shows an energy storage device 73*c* inserted in another opening 75*e* of the cover plate 43, offset in the counterclockwise direction U2 from the center line M. This device, too, is precurved and installed essentially without pretension in the opening 75*e* in such a way that the circumferentially final turn 83*e* of the energy storage device 73*c* rests against the circumferential boundary 81*i* of the opening 75*e*, whereas the circumferentially final turn 83*f* rests against the circumferential boundary 81*l*. An associated opening 75*f* in the hub disk 34 is again provided with a circumferential boundary 81*k*, against which the circumferentially final turn 83*e* of the energy storage device 73*c* rests in the starting position free of relative rotational deflection, and is also provided with a circumferential boundary 81*m*, which is separated from the assigned final turn 83*f* of the energy storage device 73*c* by an angular gap $\beta$. The circumferential boundaries 81*i*, 81*k*, 81*l*, 81*m* each serve as driver elements 90*i*, 90*k*, 90*l*, 90*m* for the energy storage device 73*c*.

Because of the way the damper functions, when the cover plate 43 is deflected from its starting position free of relative rotational deflection, the cover plate 41 (FIG. 1) will obviously be deflected simultaneously, but in the following discussion, only the cover plate 43 actually shown in the drawing will be explained. When this plate is deflected in the clockwise direction U1 from the starting position free of relative rotational deflection, this movement is transmitted immediately by the circumferential final turn 83*e* of the energy storage device 73*c* to the adjacent circumferential boundary 81*k* and thus to the hub disk 34, as a result of which the hub disk follows the movement of the cover plate 43. Nevertheless, during this relative rotational deflection, the final turn 83*b* of the energy storage device 73*a* which is adjacent in the direction of deflection does not yet make contact with the circumferential boundary 81*d* of the hub disk 34 because of its separation by the angular gap $\alpha$, as a result of which the energy storage device 73*c* alone is acting. The other energy storage device 73*a* will also go into action, i.e., its circumferentially final turn 83*b* will make contact with the circumferential boundary 81*d*, only after the relative rotational deflection of the cover plate 43 with respect to the hub disk 34 has used up the entire angular gap $\alpha$. Because only the one energy storage device 73*c* is functioning at small relative rotational deflections, i.e., before the angular gap $\alpha$ is used up, therefore, the stiffness of the set of circumferential springs 69 increases more "softly" than it does at greater relative rotational deflections which use up the entire angular gap $\alpha$, at which point the energy storage device 73*a* also goes into action.

Under the assumption that movements of the cover plate 43 with respect to the hub disk 34 in the clockwise direction U1 take place when the torsional vibration damper 67 is operating in pull mode, operating phases in push mode will result in a relative rotational deflection of the cover plate 43 versus the hub disk 34 in the counterclockwise direction U2. In this case, the circumferentially final turn 83*a* of the energy storage device 73*a* will transmit this movement immediately to the hub disk 34 via the adjacent circumferential boundary 81*b* of the disk, so that the hub disk 34 will follow the movement of the cover plate 43. Nevertheless, during this relative rotational deflection of the cover plate 43 with respect to the hub disk 34, because of the separation by the angular gap $\beta$, the final turn 83*f* of the energy storage device 73*c* which is adjacent in the direction of deflection does not yet make contact with the circumferential boundary 81*m* of the hub disk 34, which means that only the one energy storage device 73*a* is functioning. The other energy storage device 73*c* will also go into action, i.e., its circumferentially final turn 83*f* will make contact with the circumferential boundary 81*m* of the hub disk 34, only after a relative rotational deflection of the cover plate 43 with respect to the hub disk 34 which uses up the entire angular gap $\beta$. Because only the one energy storage device 73*a* is functioning at small rotational deflections, i.e., before the angular gap $\beta$ is used up, therefore, the stiffness of the set of circumferential springs 69 increases more "softly" than it does during larger rotational deflections which use up the entire angular gap $\beta$, at which point the energy storage device 73*c* also goes into action.

Of course, the angular gaps $\alpha$ and $\beta$ can be equal, but optimal adaptation to the situations present during operating phases in push mode and pull mode are usually obtained by selecting different values.

The embodiment according to FIG. 4 is essentially the same as that according to FIG. 3, except that the orientation of the circumferential boundaries 81*b*, 81*d*, 81*k*, 81*m* of the openings 75*b* and 75*f* in the hub disk 34 with respect to the circumferential boundaries 81*a*, 81*c*, 81*i*, 81*l* of the openings 75*a* and 75*e* in the cover plate 43 and thus with respect to the final turns 83*a*, 83*b*, 83*e*, 83*f* of the energy storage devices 73*a* and 73*c* is the same as that previously explained on the basis of FIG. 2. In analogy to FIG. 2, therefore, two different axes of rotation D1 and D2 a certain distance apart are also obtained in FIG. 4.

The embodiment according to FIG. 5 has a larger number of openings than the embodiment of FIG. 3. That is, proceeding in the clockwise direction U1 from the center line M, it has an additional opening 75*c* in the cover plate 43 with circumferential boundaries 81*e* and 81*g*, against which the associated circumferentially final turns 83*c* and 83*d* of an energy storage device 73*b* come to rest, where the energy storage device 73*b* is precurved and installed essentially without pretension in the opening 75*c*. An opening 75*d*, which has the circumferential boundaries 81*f* and 81*h*, furthermore, is provided in the hub disk 34. In the starting position of the torsional vibration damper 67, before any relative rotational deflection, the circumferentially final turn 83*c* of the energy storage device 73*b* is separated by an angular gap $\psi$ from the adjacent circumferential boundary 81*f*, whereas the circumferentially final turn 83*d* of the energy storage device 73*b* is separated by an angular gap $\gamma$ from the adjacent circumferential boundary 81*h*. The circumferential boundaries 81*e*, 81*f*, 81*g*, 81*h* serve as driver elements 90*e*, 90*f*, 90*g*, 90*h* for the energy storage device 73*b*.

Proceeding in the counterclockwise direction U2 from the center line M, the cover plate 43 is provided with an additional opening 75*g*, with the circumferential boundaries 81*n* and 81*p*, against which the associated circumferentially final turns 83*g* and 83*h* of an energy storage device 73*d* come to rest, where the energy storage device 73*d* is precurved and installed essentially without pretension in the opening 75*g*. An opening 75*h* is also formed in the hub disk 34, which opening has the circumferential boundaries 81*o* and 81*q*. In the starting position of the torsional vibration damper 67, before any relative rotational deflection, the circumferentially final turn 83*g* of the energy storage device 73*d* is separated by an angular gap $\epsilon$ from the adjacent circumferential boundary 81*o*, whereas the circumferentially final turn 83*h* of the energy storage device 73*d* is separated by an angular gap $\delta$ from the adjacent circumferential boundary 81*q*. The circumferential boundaries 81*n*, 81*o*, 81*p*, 81*q* serve as driver elements 90*n*, 90*o*, 90*p*, 90*q* for the energy storage device 73*d*.

During operating phases in pull mode and thus when the cover plate 43 is being deflected in the clockwise direction U1 from its starting position, i.e., from the position present before any relative rotational deflection, the energy storage device 73*c*, as already explained on the basis of FIG. 3, goes into action immediately, whereas the energy storage device 73*a* does not go into action until after the angular gap $\alpha$ is used up. In the opening 75*d* which comes next in the direction of rotation, an angular distance is also traveled which corresponds to the angular gap $\alpha$, so that, for the opening 75*d*, there remains only an angular gap equal to the difference between the angular gap γ and the angular gap α. Only after this gap equal to the difference between the previously mentioned angular gaps in the clockwise direction U1 is also used up will the circumferentially final turn 83*d* of the energy storage device 73*b* come to rest against the adjacent circumferential boundary 81*h*, so that from this point on, the energy storage device 73*b* also goes into action as a third energy storage device during the transmission of the movement of the cover plate 43 to the hub disk 34. Nevertheless, because the angular gap ε is greater than the angular gap γ, the final turn 83*g* of the fourth energy storage device 73*d* does not yet make contact with the circumferential boundary 81*o* of the hub disk 34 during this relative rotational deflection of the cover plate 43 with respect to the hub disk 34. Only after an even greater degree of relative rotational deflection of the cover plate 43 versus the hub disk 34, during which the angular gap ε is also completely used up, will the last energy storage device 73*d* go into action, in that its circumferentially final turn 83*g* makes contact with the circumferential boundary 81*o*. The energy storage devices 73*a*, 73*b*, and 73*d* are therefore deployed in three stages; only the energy storage device 73*c* is active at all times. As a result, the stiffness of the set of circumferential springs 69 increases in multiple stages and therefore in a very "soft" manner until the deflection has covered the maximum angular distance E.

During operating phases in push mode, and thus when the cover plate 43 is being deflected in the counterclockwise direction U2 from its starting position free of relative rotational deflection, the energy storage device 73*a* will, as already described on the basis of FIG. 3, go into action immediately, whereas the energy storage device 73*c* will not go into action until after the deflection has used up the angular gap β, which is also used up in the other opening 75*h*. The latter opening 75*h*, however, has an angular gap δ which is larger than the angular gap β. Only after this gap has been completely used up by deflection in the clockwise direction U1 does the circumferentially final turn 83*h* of the energy storage device 73*d* come to rest against the adjacent circumferential boundary 81*q*, this energy storage device thus acting as the third energy storage device during the transmission of the movement of the cover plate 43 to the hub disk 34. Because the angular distance v is greater than the angular distance δ, however, the final turn 83*c* of the fourth energy storage device 73*b* is not yet in contact with the circumferential boundary 81*f* of the hub disk 34 during this relative rotational deflection of the cover plate 43 with respect to the hub disk 34. Only after an even greater degree of relative rotational deflection of the cover plate 43 with respect to the hub disk 34, i.e., a deflection which also uses up the entire angular gap ψ, will the last energy storage device 73*b* also go into action, in that its circumferentially final turn 83*c* comes to rest against the circumferential boundary 81*f*. The energy storage devices 73*c*, 73*d*, and 73*b* are therefore deployed in three stages, and only the energy storage device 73*a* is active at all times. As a result, the stiffness of the set of circumferential springs 69 increases in multiple stages and therefore in a very "soft" manner until the deflection has used up the maximum angular gap ψ.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper for a bridging clutch of a hydrodynamic clutch arrangement, said damper comprising:

a plurality of energy storage devices, each said device having a pair of opposed final turns;

a drive-side transmission element which is rotatable about an axis in a first and second direction;

a takeoff-side transmission element which is rotatable about said axis by a limited amount relative to the drive-side element against the action of said energy storage devices;

wherein each of said transmission elements has at least one opening for each direction of relative rotation of the transmission elements, each said opening having a pair of opposed circumferential boundaries and accommodating a respective said energy storage device, wherein said energy storage devices are precurved and are inserted without preloading into respective said openings;

wherein, in the absence of any relative rotation of said transmission elements, one of said circumferential boundaries of each said opening in one of said transmission elements is separated from the adjacent final turn of the energy storage device in the corresponding opening in the one of said transmission elements by a predetermined angular gap; and wherein, in the presence of relative rotation in either of two selected directions sufficient to take up one of said angular gaps, one of said circumferential boundaries contacts the adjacent final turn and said one of said transmission elements rotates with the other of said transmission elements in the selected direction;

wherein each of said boundaries of each of said openings in said one of said transmission elements being essentially aligned with a respective first connecting line leading to a first axis of curvature;

each of said boundaries of each of said openings in the other of said transmission elements being essentially aligned with a respective second connecting line leading to a second axis of curvature;

one of said second connecting lines forming an adjustment angle with a corresponding one of said first connecting lines;

wherein, in the absence of any relative rotation of said transmission elements, each said final turn of each said energy storage device is aligned with a respective said second connecting line, said one of said second connecting lines forming a starting adjustment angle with said one of said first connecting lines;

wherein, as relative rotation of said transmission elements occurs, said adjustment angle changes until the relative rotation reaches a predetermined limit and said adjustment angle reaches a final adjustment angle; and wherein, when said relative rotation exceeds said predetermined limit, said adjustment angle undergoes essentially no further change; and a clutch housing having an axis of rotation coincident with the second axis of curvature, the first axis being an axis of curvature.

2. The torsional vibration damper of claim 1 wherein said one of said transmission elements has a first said opening and a second said opening for each direction of relative rotation of said transmission elements, the predetermined angular gap for each said first opening being smaller than the predetermined angular gap for the second opening in the selected direction.

3. The torsional vibration damper of claim 1 wherein at least one angular gap in a first direction of rotation differs from the corresponding at least one angular gap in the opposite direction of rotation.

4. The torsional vibration damper of claim 1 wherein at least one angular gap in a first direction of rotation is the same as the corresponding at least one angular gap in the opposite direction of rotation.

5. The torsional vibration damper of claim 1 wherein said one of said transmission elements has a first said opening and a second said opening for each direction of relative rotation of said transmission elements, the energy storage device accommodated in the second opening having a greater stiffness than the energy storage device accommodated in the first opening.

6. The torsional vibration damper of claim 5 wherein the predetermined angular gap for each said first opening is smaller than the predetermined angular gap for the second opening in the selected direction.

7. The torsional vibration damper of claim 1 wherein the starting adjustment angle and the final adjustment angle each have an absolute value, the absolute value of the starting adjustment angle being larger then the absolute value of the final adjustment angle.

8. The torsional vibration damper of claim 7 wherein the absolute value of the final adjustment angle is essentially zero.

9. The torsional vibration damper of claim 1 wherein, in the absence of any relative rotation of said transmission elements, only radially outer areas of the final turns are in contact with the adjacent circumferential boundaries, the final turns making complete radial contact with the adjacent circumferential boundaries only after the transmission elements reach the limit of relative rotation.

10. The torsional vibration damper of claim 1 wherein at least some of said openings have a radial outer side separated from the respective energy device by a clearance space, said respective energy storage device having central turns which can deflect into said clearance space.

11. The torsional vibration damper of claim 10 wherein each said radial outer side lying on a circular arc having a clearance radius around a third axis of curvature which is smaller than the first axis of curvature.

12. The torsional vibration damper of claim 11 wherein the clearance radius is smaller than a radius formed by said second connecting lines and said second axis of curvature.

* * * * *